Dec. 24, 1968   C. A. SECKERSON   3,417,439
FASTENER FOR SECURING MOULDING TO A STUD ON A SUPPORT
Filed Jan. 19, 1968

INVENTOR
Clifford Alexander Seckerson
by Philip E. Parker
Attorney

United States Patent Office 3,417,439
Patented Dec. 24, 1968

3,417,439
FASTENER FOR SECURING MOULDING TO A STUD ON A SUPPORT
Clifford Alexander Seckerson, Iver Heath, England, assignor to United-Carr Incorporated, Boston, Mass., a corporation of Delaware
Filed Jan. 19, 1968, Ser. No. 699,151
Claims priority, application Great Britain, Jan. 31, 1967, 4,709/67
4 Claims. (Cl. 24—73)

ABSTRACT OF THE DISCLOSURE

The present invention relates to a fastener for attaching a moulding having inturned flanges on a support provided with a projecting stud formed with a shank and a head. The fastener comprises a body portion, a lug on one side of the body portion which holds one flange of the moulding against the support, a slot which divides the lug into two jaw portions and a pair of arms projecting from opposite ends of the body portion and outwardly in the opposite sense to the lug to hold the other flange of the moulding against the support. The fastener is engaged on the support by sliding the fastener laterally on to the stud so that the shank extends through the slot and the head overlies the body portion and the moulding is then snap-engaged over the body portion of the fastener. The arms of the fastener are laterally deflectable and when compressed by the moulding cause the jaw portions to close up around the shank of the stud ensuring a secure connection between the fastener and the stud.

---

The present invention is concerned with the problem of providing a fastener which will securely attach a decorative moulding to a panel having a stud projecting from its outer surface.

According to the invention there is provided a fastener for securing a moulding having inturned flanges on a support formed with a projecting stud, the fastener comprising a body portion having an undersurface, a lug projecting from one side of the body portion, an end face of the lug being undercut with respect to the undersurface and adapted to engage a flange of the moulding, an aperture through the body portion to receive the said stud and a slot along which the stud is slidable into the aperture, the slot extending from the aperture through the lug to the end face of the lug and dividing the lug into two resilient jaw portions, a pair of arms extending from opposite ends of the body portion outwardly from the body portion in the opposite sense to the lug, and end faces on the arms which are undercut to engage the other flange of the moulding, said arms being resilient and laterally deflectable when the fastener is compressed between the flanges of the moulding to close the jaw portions of the lug around the stud.

A preferred form of the present invention is described below with reference to the accompanying drawings in which.

Figure 1:
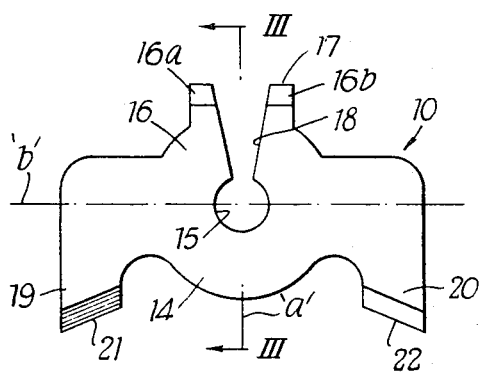
FIGURE 1 is a plan view of a fastener according to the invention.
Figure 2:
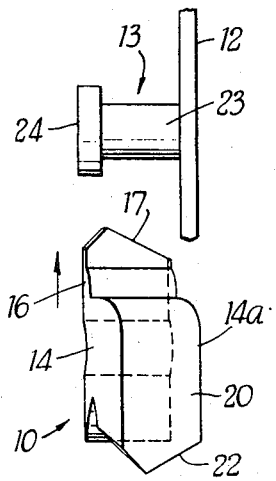
FIGURE 2 is a side elevation of the fastener shown in FIGURE 1 and a stud on which the fastener can be attached.
Figure 3:
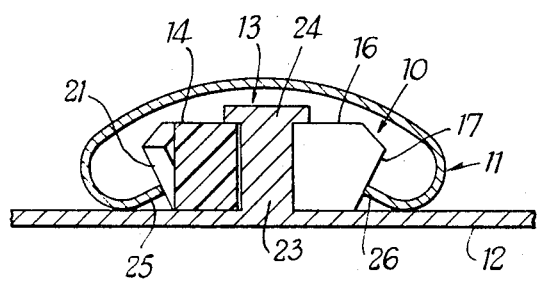
FIGURE 3 is an elevation showing the fastener of FIGURE 1 taken in section on the line III—III of FIGURE 1 attached to the stud shown in FIGURE 2.

In the drawing a fastener is indicated generally at 10, the fastener 10 being adapted for use, as shown in FIGURE 3, to attach a moulding 11 to a support 12 having a stud 13 projecting from its upper surface.

The fastener 10 is formed from a synthetic resin for instance an acrylic resin and is preferably injection moulded to the shape shown. The fastener 10 in its finished form is shaped to comprise an elongate body portion 14 which is bowed about its transverse axis $a$ so as to have a concave undersurface 14a and formed with a central approximately circular aperture 15. The body 14 is formed with a lug 16 which projects outwardly from one of the longer sides of the body approximately midway along the length of the body and the outer face 17 of the lug 16, which lies parallel with the longitudinal axis "$b$" of the body 14, is undercut with respect to the under-surface 14a. A slot 18 extends outwardly from the aperture 15 to the face 17 so as to divide the lug 16 into a pair of jaw portions 16a, 16b which are resiliently movable towards and away from one another. The slot 18 tapers from the face 17 towards the aperture 15 and at its junction with the aperture 15 its width is substantially less than the diameter of the aperture.

Two similar arms 19 and 20 project outwardly from the ends of the body 14, in the opposite sense to the lug 16 and end faces 21 and 22 of the arms 19 and 20 are undercut in a similar manner to the face 17 of the lug 16. The end faces 21 and 22 of the arms 19 and 20 are similarly inclined to the longitudinal axis $b$ of the body portion at an angle such that their extensions would form an obtuse angle of approximately 135° on the transverse axis $a$.

The stud 13 on which the fastener 10 is attached, as shown in FIGURE 3, comprises a cylindrical shank 23, which is welded or otherwise attached to the support 12 and has a diameter slightly less than the diameter of the aperture 15, and a circular head 24, which has a diameter greater than the diameter of the aperture 15. The length of the shank 23 is equal to or fractionally greater than the perpendicular distance between the normally convex and concave surfaces of the body portion 14 when the body portion is flattened.

In order to attach the fastener 10 to the stud 13, the concave undersurface of the body portion 14 is placed on the support 12 adjacent the stud 13 and is then flattened against the support. The fastener 10 is then slid bodily towards the stud so that the shank 23 passes along the slot 18 and snap engages into the aperture 15. As the shank 23 passes along the slot 18, the jaw portions of the lug 16 open and then close behind the shank to retain the shank in the aperture 15. The length of the shank 23 is such that the body portion is held in its flattened condition under permanent stress thus ensuring a firm rattle free connection between the support and the fastener 10. The curvature of the body portion 14 also gives a considerable tolerance in the length of the shank of the stud to which the fastener 10 is attached.

When the fastener 10 is attached to the support 12, the moulding 11, which is formed with inturned flanges 25 and 26, is snap engaged over the body portion in a well known manner so that the flange 25 is held between the support 12 and the undercut faces 21 and 22 and the flange 26 is held between the support 12 and the undercut face 17.

The distance between the flanges 25 and 26 is such that the undercut faces 21 and 22 are forced back and rotated slightly towards the longitudinal axis $b$ of the fastener 10 and the body portion 14 acts in the manner of a spring causing the jaw portions 16a, 16b of the lug 16 to close up tightly around the stud 13, increasing the security of the connection between the fastener and the stud.

What I claim is:
1. A fastener for securing a moulding having inturned flanges on a support formed with a projecting stud, the fastener comprising a body portion having an undersur- face, a lug projecting from one side of the body portion, an end face of the lug being undercut with respect to the undersurface and adapted to engage a flange of the moulding, there being an aperture through the body portion to receive the said stud and a slot along which the stud is slidable into the aperture, the slot extending from the aperture through the lug to the end face of the lug and dividing the lug into two resilient jaw portions, a pair of arms extending from opposite ends of the body portion outwardly from the body portion in the opposite sense to the lug, and end faces on the arms which are undercut to engage the other flange of the moulding, said arms being resilient and laterally deflectable when the fastener is compressed between the flanges of the moulding to close the jaw portions of the lug around the stud.

2. A fastener as claimed in claim 1, wherein the undersurface of the body portion is concave when the fastener is unstressed.

3. A fastener as claimed in claim 1, wherein the said slot is tapered from the said end face of the lug towards the aperture.

4. A fastener for securing a moulding having inturned flanges on a support provided with a projecting stud which is formed with a shank and a head, the fastener comprising a body portion having a lug projecting from one side of the body portion for engaging a flange of the moulding, there being a slot along which the shank of the stud is slidable, the said slot dividing the lug into two jaw portions and terminating in the body portion, and two arms projecting outwardly from opposite ends of the body portion in the opposite sense to the lug for engaging the other flange of the moulding, said arms being laterally deflectable towards the body portion and said jaw portions being closed up when said arms are deflected, said body portion acting in the manner of a hinge.

References Cited

UNITED STATES PATENTS

| 3,153,468 | 10/1964 | Sweeney. | |
|---|---|---|---|
| 3,239,988 | 3/1966 | Meyer | 52—718 |
| 3,323,181 | 6/1967 | Seckerson | 52—718 |
| 3,360,832 | 1/1968 | Seckerson. | |

FOREIGN PATENTS 323,832   1/1930   Great Britain.

DONALD A. GRIFFIN, *Primary Examiner.*

U.S. Cl. X.R.

52—718